(12) United States Patent
Bai et al.

(10) Patent No.: US 10,691,399 B2
(45) Date of Patent: Jun. 23, 2020

(54) METHOD OF DISPLAYING MOBILE DEVICE CONTENT AND APPARATUS THEREOF

(71) Applicant: GM GLOBAL TECHNOLOGY OPERATIONS LLC, Detroit, MI (US)

(72) Inventors: Fan Bai, Ann Arbor, MI (US); Robert A. Hrabak, Sterling Heights, MI (US); Robert A. Bordo, Harrison Township, MI (US); Amanda J. Damman, White Lake, MI (US); Valentin Bona, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/120,525

(22) Filed: Sep. 4, 2018

(65) Prior Publication Data

US 2020/0073620 A1 Mar. 5, 2020

(51) Int. Cl.
*G06F 3/14* (2006.01)
*G09G 5/00* (2006.01)

(52) U.S. Cl.
CPC .......... *G06F 3/1454* (2013.01); *G06F 3/1423* (2013.01); *G09G 5/006* (2013.01); *G09G 2354/00* (2013.01); *G09G 2370/16* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 2010/0220250 A1* | 9/2010 | Vanderwall | G01C 11/02 348/837 |
| 2015/0099495 A1* | 4/2015 | Crosbie | B60W 50/14 455/414.3 |
| 2017/0188110 A1* | 6/2017 | Cansino | H04N 21/4882 |
| 2018/0129467 A1* | 5/2018 | Gage | G06F 3/1454 |

* cited by examiner

*Primary Examiner* — Christopher J Kohlman (57) ABSTRACT

An apparatus configured to display applications provided by a single mobile device is provided. The apparatus includes a plurality of displays, a wireless communication device configured to receive first output data corresponding to a first display of the plurality of displays and second output data corresponding to a second display of the plurality of displays from an external device consisting of one mobile device, and a controller configured to direct the received first output data from the wireless communication device to be displayed on the first display and direct the received second output data from the wireless communication device to be displayed on the second display.

16 Claims, 4 Drawing Sheets

METHOD OF DISPLAYING MOBILE DEVICE CONTENT AND APPARATUS THEREOF

INTRODUCTION

Apparatuses and methods consistent with exemplary embodiments relate to mobile devices. More particularly, apparatuses and methods consistent with exemplary embodiments relate to displaying, projecting or rendering images corresponding to mobile device applications.

SUMMARY

One or more exemplary embodiments provide a plurality of displays configured to display and output application data from a single mobile device. More particularly, one or more exemplary embodiments provide an apparatus that mediates inputs from a plurality of displays and controls to display data from a single mobile device to the plurality of displays.

According to an aspect of an exemplary embodiment, an apparatus configured to display applications provided by a single mobile device is disclosed. The apparatus includes a plurality of displays, a wireless communication device configured to receive first output data corresponding to a first display of the plurality of displays and second output data corresponding to a second display of the plurality of displays from an external device consisting of one mobile device, and a controller configured to direct the received first output data from the wireless communication device to be displayed on the first display and direct the received second output data from the wireless communication device to be displayed on the second display.

The apparatus may also include an input device configured to receive a first input corresponding to the first display and a second input corresponding to the second display, and the controller is configured to direct information corresponding to the first input and the second input to the mobile device via the wireless communication device. The controller may direct the received first output data and the received second output data to first and second displays, respectively, via a physical wired connection.

The output data may be one or more from among audio information, video information, haptic feedback information, and application metadata.

The controller may be configured to filter the received output data based on a user context and a user policy. The user context may be one or more from among a user location in a vehicle, a configuration of the user in the vehicle, and a vehicle driving status. The user policy may be a table indicating whether output data corresponding to a specific application is blocked or allowed based on the user location in a vehicle and the vehicle driving status.

The controller is configured to receive an output data identification, an output data category, and a desired codec from the mobile device via the wireless communication device and to send a list of available codecs corresponding to the received desired codec to the mobile device via the wireless communication device.

The controller may be configured to receive a codec selected from the list of available codecs and desired codec parameters from the mobile device via the wireless communication device, and to send a list of available codec parameters corresponding to desired codec parameters to the mobile device via the wireless communication device.

The controller may be configured to receive a codec parameter selected from the list of available codec parameters from the mobile device via the wireless communication device, and to control to output the output data according to the selected codec and selected codec parameter.

The controller may be configured to provision system resources between the first display and the second display based on the available system resource, Quality-of-Experience (QoE) requirement of application, and user configuration preference.

According to an aspect of an exemplary embodiment, a method for display applications provided by a single mobile device. The method includes: receiving, via a wireless communication device, first output data corresponding to a first display of the plurality of displays and second output data corresponding to a second display of the plurality of displays from an external device consisting of one mobile device, and directing the received first output data from the wireless communication device to be displayed on a first display and directing the received second output data from the wireless communication device to be displayed on the second display.

The method may further include receiving, via an input device, a first input corresponding to the first display and a second input corresponding to the second display and directing information corresponding to the first input and the second input to the mobile device via the wireless communication device. The directing may include directing the received first output data and the received second output data to first and second displays, respectively, via a physical wired connection.

The output data may be one or more from among audio information, video information, haptic feedback information, and application metadata.

The method may further include filtering the received output data based on a user context and a user distraction policy.

The user context may be one or more from among a user location in a vehicle, configuration of the user in the vehicle, and a vehicle driving status. The user policy may include a table indicating whether output data corresponding to a specific application is blocked or allowed based on the user location in the vehicle and the vehicle driving status.

The method may include provisioning system resources between the first display and the second display based on one or more from among available system resources, a Quality-of-Experience (QoE) requirement of an application, and user configuration preference.

The method may further include receiving an output data identification, an output data category, and a desired codec from the mobile device via the wireless communication device, and sending a list of available codecs corresponding to the received desired codec to the mobile device via the wireless communication device.

The method may further include receiving a codec selected from the list of available codecs and desired codec parameters from the mobile device via the wireless communication device, and sending a list of available codec parameters corresponding to desired codec parameters to the mobile device via the wireless communication device.

The method may further include receiving a codec parameter selected from the list of available codec parameters from the mobile device via the wireless communication device, and controlling to output the output data according to the selected codec and the selected codec parameter.

Other objects, advantages and novel features of the exemplary embodiments will become more apparent from the following detailed description of exemplary embodiments and the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

An apparatus configured to display applications provided by a single mobile device will now be described in detail with reference to FIG. 1-4 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles are being equipped with multiple displays and infotainment systems. These infotainment systems are designed to provide information and entertainment to occupants of vehicle. Some infotainment systems may be configured to project or display applications provided by a mobile device of an occupant. The process of displaying may be performed through a wired connection. However, only one display may be displayed to at a time. Thus, it would be beneficial to occupants of a vehicle if it was possible to provide applications to multiple displays and have the applications controlled independently by occupants of seats corresponding to each of the multiple displays, via sharing the same system resource of such mobile devices (e.g., a phone, a dongle, etc.) among multiple displays.

Figure 1:
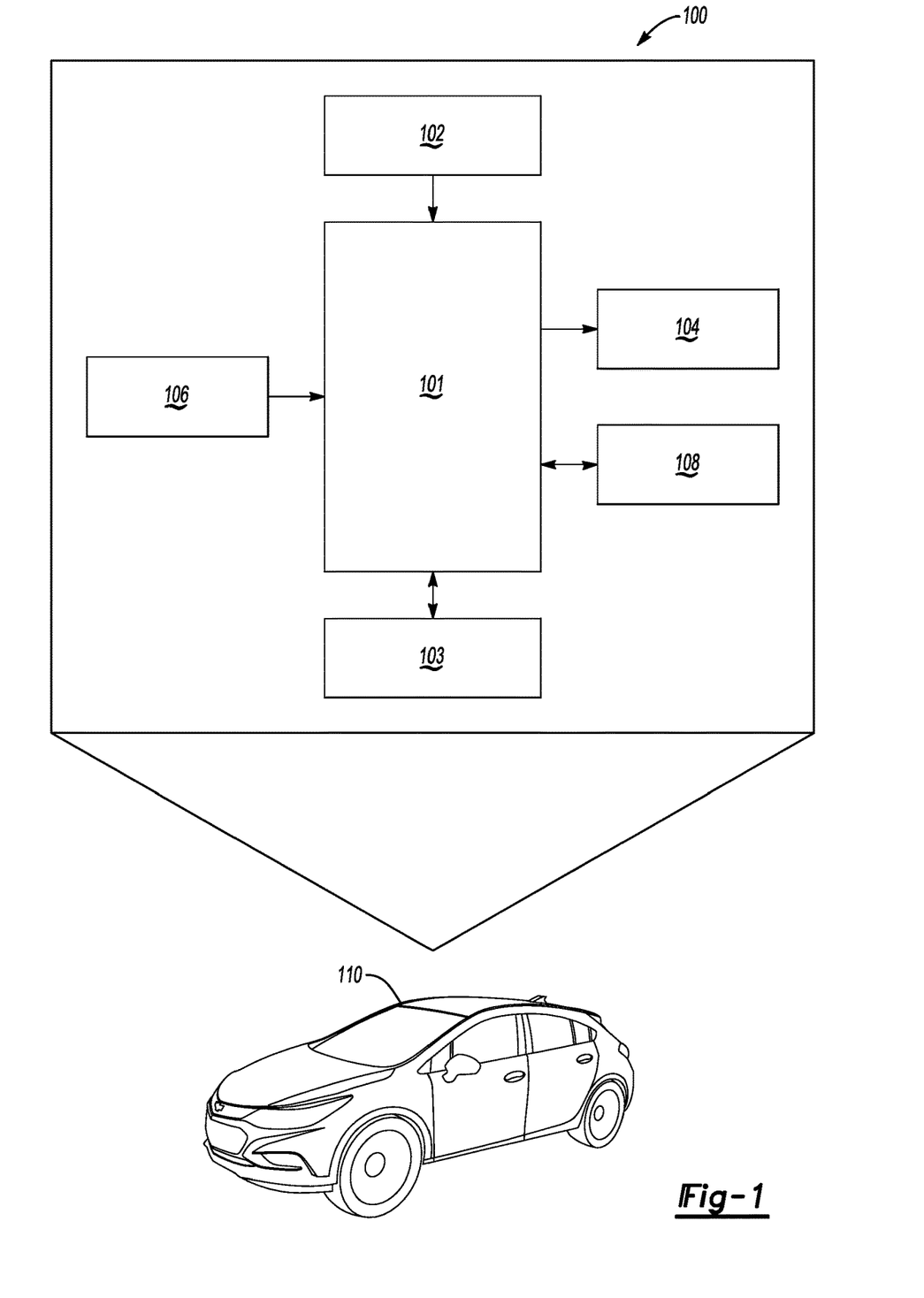
FIG. 1 shows a block diagram of an apparatus configured to display applications provided from a single mobile device according to an exemplary embodiment.

FIG. 1 shows a block diagram of an apparatus that displays applications provided by a single mobile device 100 according to an exemplary embodiment. The apparatus may project the applications provided by the single mobile device. For example, projecting a screen may include displaying, on a display external to, separated from or detached from a mobile device, a screen, application, movie or image, etc. that is rendered at the mobile device.

As shown in FIG. 1, the apparatus that displays applications provided by a single mobile device 100, according to an exemplary embodiment, includes a controller 101, a power supply 102, a storage 103, an output 104, a user input 106, and a communication device 108. However, the apparatus that displays applications provided by a single mobile device 100 is not limited to the aforementioned configuration and may be configured to include additional elements and/or omit one or more of the aforementioned elements. The apparatus that displays applications provided by a single mobile device 100 may be implemented as part of a vehicle 110, as a standalone component, as a hybrid between an on vehicle and off vehicle device, or in another computing device.

The controller 101 controls the overall operation and function of the apparatus that displays applications provided by a single mobile device 100. The controller 101 may directly or indirectly control one or more of a power supply 102, a storage 103, an output 104, a sensor 105, a user input 106, a temperature sensor 107, a communication device 108 and a cooling device 109, of the apparatus that displays applications provided by a single mobile device 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the power supply 102, the storage 103, the output 104, the user input 106, and the communication device 108 of the apparatus that displays applications provided by a single mobile device 100. The information may be sent and received via a bus or network, or may be directly read or written to/from one or more of the power supply 102, the storage 103, the output 104, the user input 106, and the communication device 108 of the apparatus that displays applications provided by a single mobile device 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the storage 103, the output 104, the sensor 105, the user input 106, the temperature sensor 107, the communication device 108 and the cooling device 109, of the apparatus that displays applications provided by a single mobile device 100. The power supply 102 may include one or more from among a battery, an outlet, a capacitor, a solar energy cell, a solar panel, a generator, a wind energy device, an alternator, etc.

The storage 103 is configured for storing information and retrieving information used by the apparatus that displays applications provided by a single mobile device 100. The storage 103 may be controlled by the controller 101 to store and retrieve information received from one or more sensors 105, the temperature sensor 107, as well as computer or machine executable instructions to control the cooling device 109. The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The storage 103 may store information on one or more from among a user context and a user distraction policy. The user context may be one or more from among a user location in a vehicle, configuration of the user in the vehicle, and a vehicle driving status. The configuration of the user in the vehicle may be information corresponding to a seating direction of the user, a seating position of the user, a field of view of the user, or whether the user is wearing a safety belt. The vehicle driving status may include information corresponding to a transmission status of a vehicle, a direction of travel of a vehicle, a speed of a vehicle, an acceleration of a vehicle, a location of a vehicle, an environment of a vehicle. The location of the user in the vehicle may be determined by Wi-Fi or Bluetooth Low Energy (BLE) in-vehicle localization. The user policy may be a table or other data structure indicating whether output data corresponding to a specific application is blocked or allowed based on the user location in a vehicle and the vehicle driving status. The storage 103 may also store machine-readable instructions executable to implement the apparatus that displays applications provided by a single mobile device 100.

The output 104 outputs information or data in one or more forms including: visual, audible and/or haptic form. The output 104 may be controlled by the controller 101 to provide outputs to the user of the apparatus that displays applications provided by a single mobile device 100. The output 104 may include one or more from among a speaker, audio, a display, a centrally-located display, a head up display, a windshield display, a haptic feedback device, a vibration device, a tactile feedback device, a tap-feedback device, a holographic display, an instrument light, an indicator light, etc. The output 104 may output notification including one or more from among an audible notification, a light notification, and a display notification.

The user input 106 is configured to provide information and commands to the apparatus that displays applications provided by a single mobile device 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104.

The communication device 108 may be used by apparatus that displays applications provided by a single mobile device 100 to communicate with several types of external apparatuses according to various communication methods. The communication device 108 may be used to send/receive various information such as information on operation mode of the vehicle and control information for operating the apparatus that displays applications provided by a single mobile device 100 to/from the controller 101.

In one example, the communication device 108 may receive first output data corresponding to a first display of a plurality of displays and second output data corresponding to a second display of the plurality of displays from an external device consisting of one mobile device. In another example, the communication device 108 may send a first input corresponding to a first display and a second input corresponding to a second display received from input devices of input 106 corresponding to the mobile device, while sharing the same projection system resource between both displays.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an example, the controller 101 of the apparatus that displays applications provided by a single mobile device 100 may be configured to direct received first output data from the wireless communication device to be displayed on the first display and direct received second output data from the communication device 108 to be displayed on the second display. According to an example, the controller 101 of the apparatus that displays applications provided by a single mobile device 100 may be configured to direct the received first output data and the received second output data to first and second displays, respectively, via a physical wired connection or bus. According to an example, the controller 101 of the apparatus that displays applications provided by a single mobile device 100 may be configured to direct information corresponding to a first input and a second input to the mobile device via the communication device 108.

According to an example, the controller 101 of the apparatus that displays applications provided by a single mobile device 100 may be configured to receive an output data identification, an output data category, and a desired codec from the mobile device via the wireless communication device and to send a list of available codecs corresponding to the received desired codec to the mobile device via the wireless communication device. According to another example, the controller 101 of the apparatus that displays applications provided by a single mobile device 100 may be further configured to receive a codec selected from the list of available codecs and desired codec parameters from the mobile device via the wireless communication device, and to send a list of available codec parameters corresponding to desired codec parameters to the mobile device via the wireless communication device. According to yet another example, the controller 101 of the apparatus that displays applications provided by a single mobile device 100 may be further configured to receive a codec parameter selected from the list of available codec parameters from the mobile device via the wireless communication device, and to control to output the output data according to the selected codec and selected codec parameter. The codec parameter may be selected based on available system resources, Quality-of-Experience (QoE) requirement of applications, and/or user configuration preferences.

Figure 2:
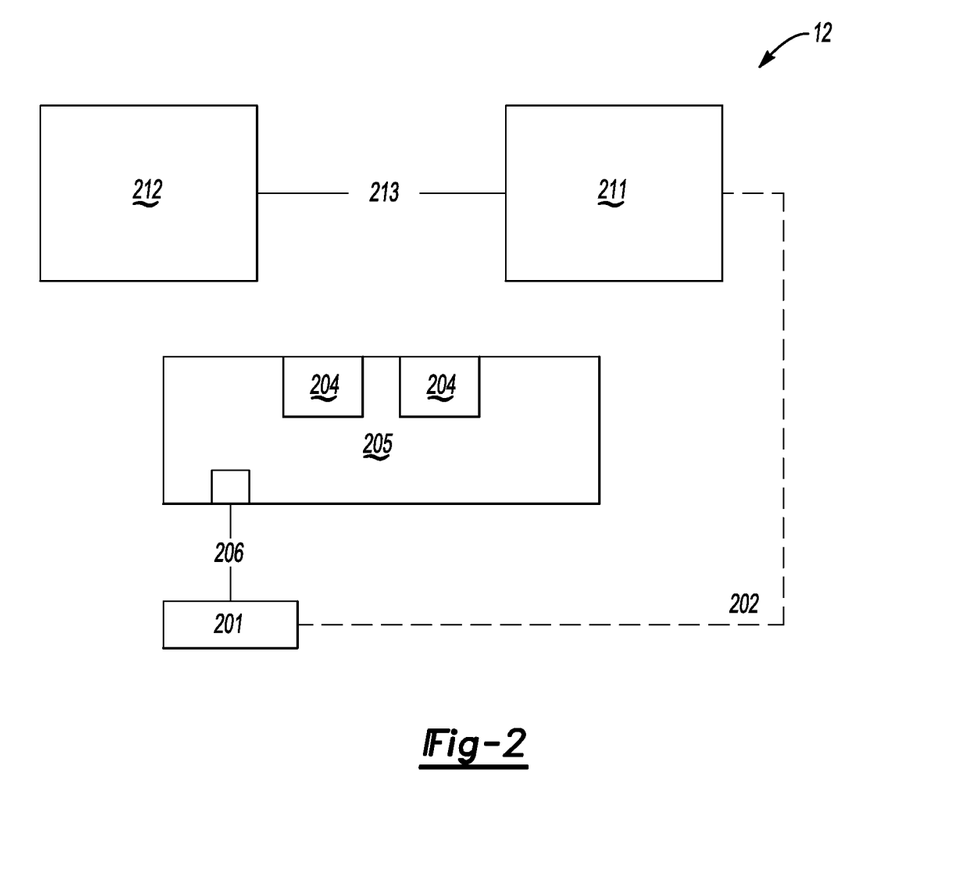
FIG. 2 shows a diagram illustrating a communication path from a mobile device to multiple displays according to an aspect of an exemplary embodiment.

FIG. 2 shows a diagram illustrating a communication path from a mobile device to multiple displays according to an aspect of an exemplary embodiment.

Referring to FIG. 2, external mobile device 201 may establish a connection to infotainment system 205 and display 211 via Wi-Fi connection 202 or other suitable wireless connection. The external mobile device 201 may store, execute and run various programs. Alternatively, the external mobile device 201 may establish a connection to infotainment system 205 and display 211 via wired connection 206 to a USB outlet 204 or other suitable outlet or port.

The mobile device may transmit output data of two or more applications, each of the two applications to be output on separate displays 211 and 212 through the established connection 202 or the established connection 206. The controller of the infotainment system 205 may then control to output data corresponding to display 211 to be output to display 211 and to direct output data corresponding to display 212 to be output to display 212 via wired connection or bus 213.

Figure 3:
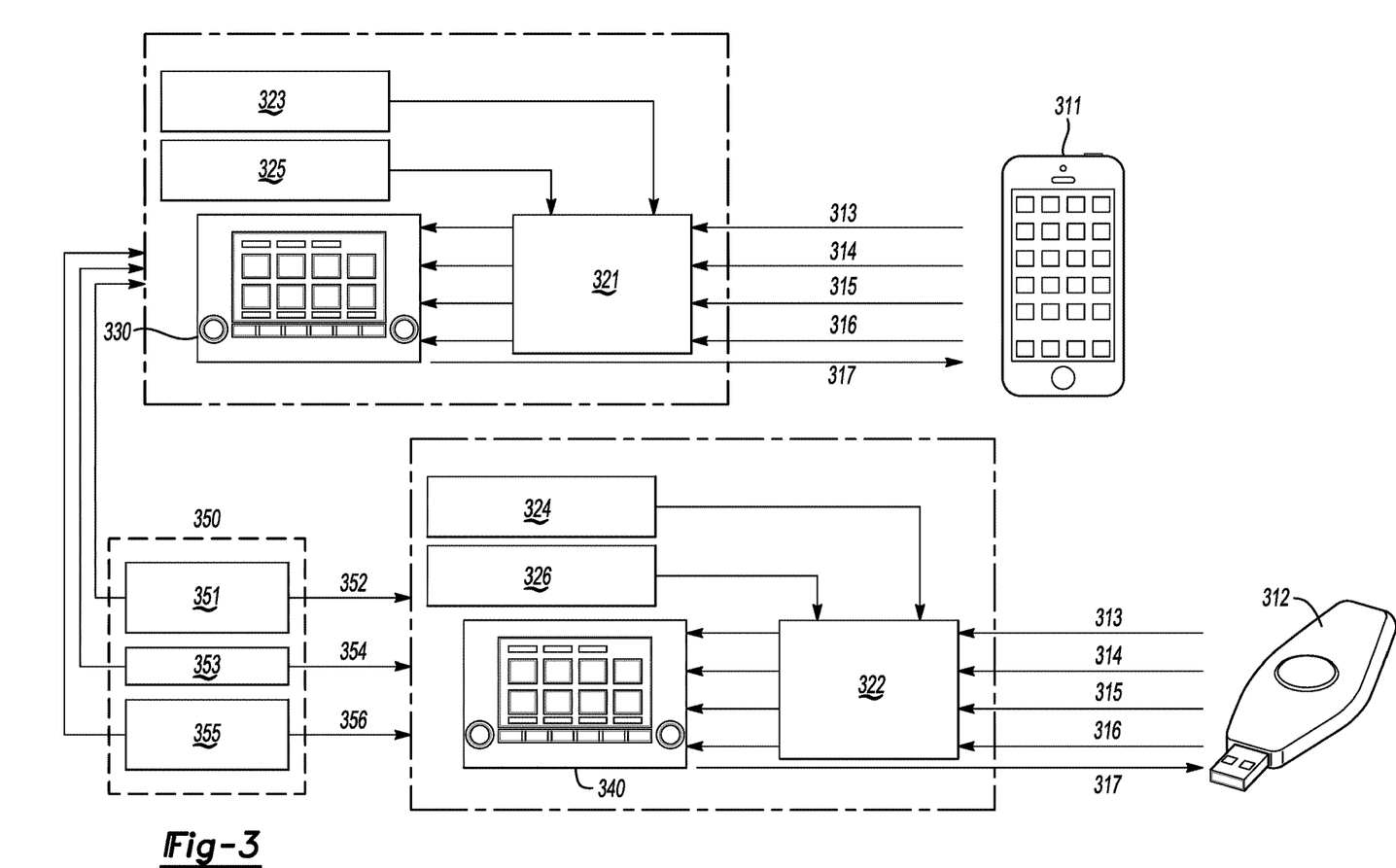
FIG. 3 shows a flow diagram illustrating information exchanged between a mobile device and multiple displays according to an aspect of an exemplary embodiment.

FIG. 3 shows a flow diagram illustrating information exchanged between a mobile device and multiple displays according to an aspect of an exemplary embodiment.

Referring to FIG. 3, output data from external devices 311 and 312, a mobile phone and USB device, respectively, is input into filtering modules 321 and 322. In this example, the output data includes one or more from among audio data 313, video data 314, haptic feedback data 315, and application metadata and information 316. However, the output data may data corresponding to any application or content of the external devices 311 and 312.

The filtering modules 321 and 322 may allow output data to be output on the displays 330 and 340 or may block or filter output data based on user contexts 323 and 324 and user distraction policies 325 and 326. Thus, display units 330 and 340 may only output data that appropriate for the user context and that is in compliance with a desired policy, such as a user distraction management policy. Moreover, input devices such as a touch screen integrated with the display or other input device may be used to send input data 317 to control external devices 311 and 312 to request additional output data or to provide inputs to applications being executed by the external devices 311 and 312.

Projection module 350 may be used to send one or more from among video data 352 using video codec 351, audio data 354 using audio codec 352, and other data such as control data 355 using controller area network access protocol 353 between the output devices or displays 330 and 340. Thus, only one of external devices 311 and 312 may be used to project content or applications on both output devices or displays 330 and 340.

Figure 4:
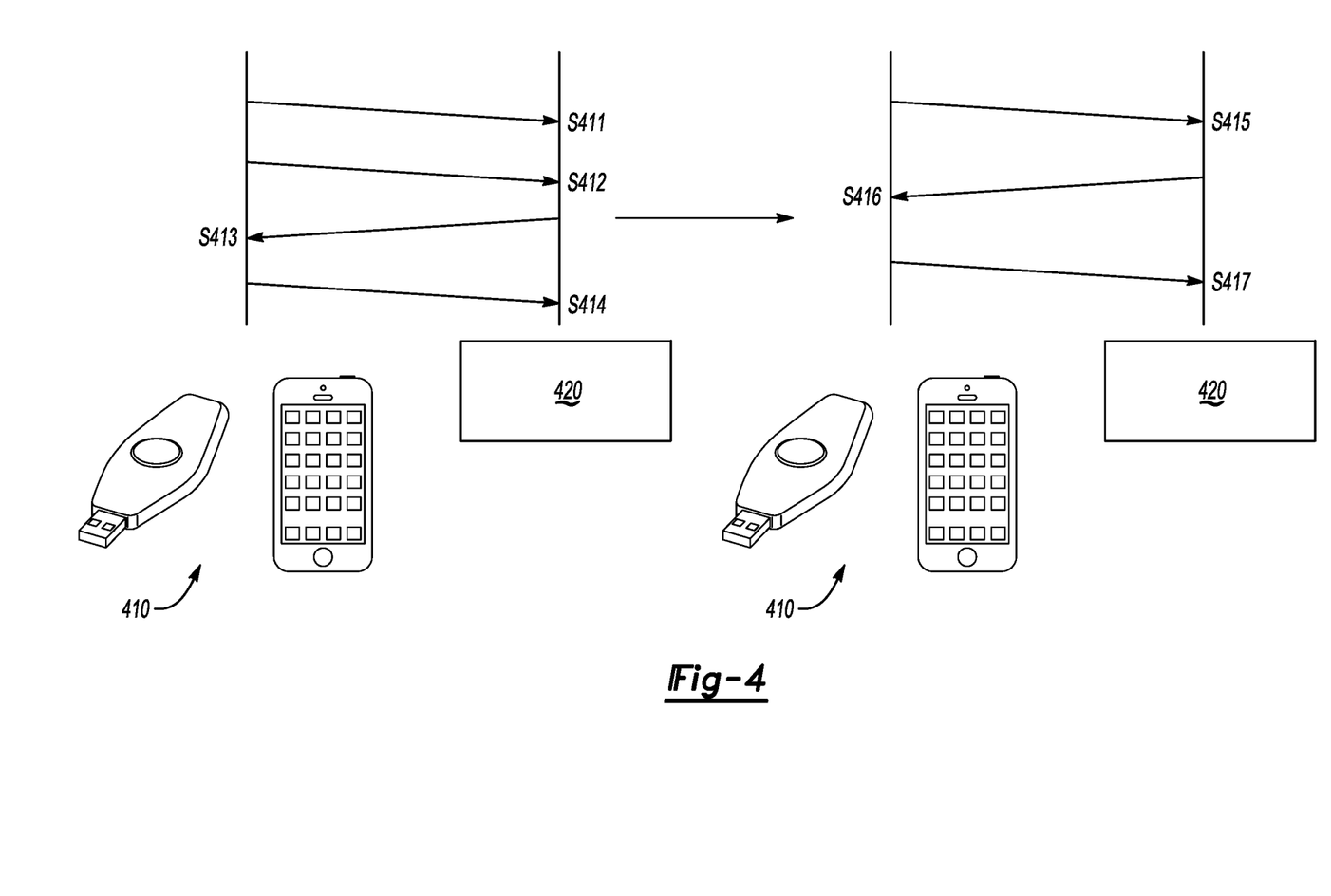
FIG. 4 shows a flow diagram of a method of provisioning a hardware and software resources to display applications provided by a single mobile device to aspect of an exemplary embodiment.

FIG. 4 shows a flow diagram of a method of provisioning a hardware and software resources to display applications provided by a single mobile device to aspect of an exemplary embodiment.

Referring to FIG. 4, one or more external devices 410 may communicate with hardware and software resource provisioning module 420 to setup communication from one or more external devices 410 for output data from the one or more external devices 410 to be output onto multiple output devices.

In particular, output data identifiers, an output data category, and a desired codec are sent from one or more external devices 410 via the wireless communication device to hardware and software resource provisioning module 420 in operations S411 and S412. The hardware and software resource provisioning module 420 may then send a list of available codecs corresponding to the received desired codec to one or more external devices 410 via the wireless communication device in operation S413.

In operations S414 and S415, the hardware and software resource provisioning module 420 may receive a codec selected at the one or more external devices 410 from the list of available codecs and desired codec parameters selected at the one or more external devices 410 from the one or more external devices 410 via the wireless communication device.

The hardware and software resource provisioning module 420 may then send a list of available codec parameters corresponding to desired codec parameters selected at the one or more external devices 410 to the one or more external devices 410 via the wireless communication device in operation S416. The one or more external devices 410 may then select and send a codec parameter selected from the list of available codec parameters to the hardware and software resource provisioning module 420 via the wireless communication device in operation S417. The hardware and software resource provisioning module 420 may select codecs and provision system resources based on the provision protocols of the designed system. The codec parameter may be selected based on available system resources, Quality-of-Experience (QoE) requirement of applications, and/or user configuration preferences. The system resources may include bandwidth, processing power, resolution, etc. The QoE requirement of the application may include frame rate, responsiveness, resolution. The user configuration preferences may include resolution and audio settings. The output data may then be output according to the selected codec and the selected codec parameter.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. An apparatus configured to display applications provided by a single mobile device, the apparatus comprising:
   a plurality of displays;
   a first input device configured to receive a first input corresponding to the first display and a second input device configured to receive a second input corresponding to the second display;
   a wireless communication device configured to receive first output data corresponding to a first display of the plurality of displays and second output data corresponding to a second display of the plurality of displays from an external device consisting of one mobile device; and
   a controller configured to direct the received first output data from the wireless communication device to be displayed on the first display and direct the received second output data from the wireless communication device to be displayed on the second display,
   wherein the controller is configured to direct information corresponding to the first input and the second input to the mobile device via the wireless communication device, and
   wherein the controller is configured to receive an output data identification, an output data category, and a desired codec from the mobile device via the wireless communication device and to send a list of available codecs corresponding to the received desired codec to the mobile device via the wireless communication device.

2. The apparatus of claim 1, wherein the controller directs the received first output data and the received second output data to first and second displays, respectively, via a physical wired connection.

3. The apparatus of claim 1, wherein the output data comprises one or more from among audio information, video information, haptic feedback information, and application metadata.

4. The apparatus of claim 1, wherein the controller is configured to filter the received output data based on a user context and a user policy.

5. The apparatus of claim 4, wherein the user context comprises one or more from among a user location in a vehicle, a configuration of the user in the vehicle, and a vehicle driving status, and
   wherein the user policy comprises a table indicating whether output data corresponding to a specific application is blocked or allowed based on the user location in a vehicle and the vehicle driving status.

6. The apparatus of claim 1, wherein the controller is configured to receive a codec selected from the list of available codecs and desired codec parameters from the mobile device via the wireless communication device, and to send a list of available codec parameters corresponding to desired codec parameters to the mobile device via the wireless communication device.

7. The apparatus of claim 6, wherein the controller is configured to receive a codec parameter selected from the list of available codec parameters from the mobile device via the wireless communication device, and to control to output the output data according to the selected codec and selected codec parameter.

8. The apparatus of claim 1, wherein the controller is configured to provision system resources between the first display and the second display based on the available system resource, Quality-of-Experience (QoE) requirement of application, and user configuration preference.

9. A method for display applications provided by a single mobile device, the method comprising:
   receiving an output data identification, an output data category, and a desired codec from the mobile device via the wireless communication device;
   sending a list of available codecs corresponding to the received desired codec to the mobile device via the wireless communication device;
   receiving, via a wireless communication device, first output data corresponding to a first display of the plurality of displays and second output data corresponding to a second display of the plurality of displays from an external device consisting of one mobile device;
   directing the received first output data from the wireless communication device to be displayed on a first display and directing the received second output data from the wireless communication device to be displayed on the second display;
   receiving, via a first input device at the first display, a first input corresponding to the first display;
   receiving, via a second input device at the second display, a second input corresponding to the second display; and
   directing information corresponding to the first input and the second input to the mobile device via the wireless communication device.

10. The method of claim 9, wherein the directing comprises directing the received first output data and the received second output data to first and second displays, respectively, via a physical wired connection.

11. The method of claim 9, wherein the output data comprises one or more from among audio information, video information, haptic feedback information, and application metadata.

12. The method of claim 9, further comprising filtering the received output data based on a user context and a user distraction policy,
    wherein the user context comprises one or more from among a user location in a vehicle, configuration of the user in the vehicle, and a vehicle driving status.

13. The method of claim 12, wherein the user policy comprises a table indicating whether output data corresponding to a specific application is blocked or allowed based on the user location in the vehicle and the vehicle driving status.

14. The method of claim 9, further comprising provisioning system resources between the first display and the second display based on available system resources, a Quality-of-Experience (QoE) requirement of an application, and user configuration preference.

15. The method of claim 9, further comprising:
    receiving a codec selected from the list of available codecs and desired codec parameters from the mobile device via the wireless communication device; and
    sending a list of available codec parameters corresponding to desired codec parameters to the mobile device via the wireless communication device.

16. A method for display applications provided by a single mobile device, the method comprising:

receiving, via a wireless communication device, first output data corresponding to a first display of the plurality of displays and second output data corresponding to a second display of the plurality of displays from an external device consisting of one mobile device;

directing the received first output data from the wireless communication device to be displayed on a first display and directing the received second output data from the wireless communication device to be displayed on the second display;

receiving an output data identification, an output data category, and a desired codec from the mobile device via the wireless communication device;

sending a list of available codecs corresponding to the received desired codec to the mobile device via the wireless communication device;

receiving a codec selected from the list of available codecs and desired codec parameters from the mobile device via the wireless communication device;

sending a list of available codec parameters corresponding to desired codec parameters to the mobile device via the wireless communication device;

receiving a codec parameter selected from the list of available codec parameters from the mobile device via the wireless communication device; and controlling to output the output data according to the selected codec and the selected codec parameter.

\* \* \* \* \*